United States Patent [19]

Hausauer

[11] Patent Number: 5,590,316
[45] Date of Patent: Dec. 31, 1996

[54] CLOCK DOUBLER AND SMOOTH TRANSFER CIRCUIT

[76] Inventor: Brian S. Hausauer, 16914 Timberwork Rd., Spring, Tex. 77379

[21] Appl. No.: 445,184

[22] Filed: May 19, 1995

[51] Int. Cl.$^6$ .................. G06F 1/04; G06F 1/12
[52] U.S. Cl. .......................... 395/556; 395/281
[58] Field of Search ................... 395/550, 281, 395/297, 304, 309, 845, 855

[56] References Cited

U.S. PATENT DOCUMENTS

| | | | |
|---|---|---|---|
| 4,984,195 | 1/1991 | Nakamura et al. | 395/281 |
| 5,101,492 | 3/1992 | Schultz et al. | 395/575 |
| 5,295,247 | 3/1994 | Chang et al. | 395/325 |
| 5,448,715 | 9/1995 | Lelm et al. | 395/550 |
| 5,485,602 | 1/1996 | Ledbetter, Jr. et al. | 395/550 |

OTHER PUBLICATIONS

EISA With Enhanced Master Burst (EMB), Addendum (Rev. 1) ©1993 BCPR Services, Inc.

*Primary Examiner*—Thomas M. Heckler
*Assistant Examiner*—Dennis M. Butler
*Attorney, Agent, or Firm*—Pravel, Hewitt, Kimball & Krieger

[57] ABSTRACT

An apparatus is disclosed for smoothly multiplying the frequency of a computer's basic clock during a burst transfer cycle and smoothly resuming the basic clock frequency upon completing the burst transfer cycle. A fixed frequency multiplier is connected to the basic clock to generate a clock whose frequency is a multiple of the basic clock frequency. A decoder which operates synchronously with the fixed frequency multiplier clock responds to control signals of the expansion bus to detect the start and the end of a burst transfer cycle. The decoder also toggles a speed-up signal during the burst transfer cycle on the rising edges of the fixed frequency multiplier clock. The speed-up signal and the basic clock is provided to a variable frequency multiplier which multiplies the frequency of the basic clock when the speed-up signal is toggled and reproduces the frequency of the basic clock when the speed-up signal is deasserted, thus providing a clock signal whose rising edges are aligned with the rising and falling edges of the basic clock and whose frequency is a multiple of the basic clock frequency during the burst transfer cycle.

14 Claims, 10 Drawing Sheets

(PRIOR ART)

FIG. 10

(PRIOR ART)

CLOCK DOUBLER AND SMOOTH TRANSFER CIRCUIT

BACKGROUND OF THE INVENTION

1. Field of the Invention

The present invention relates to an apparatus for increasing the data transfer rate of a computer. More particularly, the invention relates to an apparatus for smoothly multiplying the frequency of a basic clock of the computer during a burst transfer cycle and smoothly resuming the basic clock frequency upon completing the burst transfer cycle.

2. Description of the Related Art

The personal computer industry is evolving quickly due to the user's demands for faster, smaller, and more powerful computers. To flexibly accommodate the needs of a variety of applications, a personal computer typically has an expansion bus such as an extended industry standard architecture (EISA) bus for interfacing the microprocessor with one or more optional external plug-in logic circuit boards.

Derived from the original industry standard architecture (ISA) standard which is still in use today, all EISA performance and function enhancements are superset features of the ISA bus standard. The EISA specification provides for a variety of cycle types to cover the range of speed and complexity requirements for different applications. The EISA bus specification describes all parameters that must be followed for any device to communicate with an EISA bus and is fully disclosed in Appendix A of U.S. Pat. No. 5,101,492, hereby incorporated by reference.

Under the EISA specification, the standard EISA transfer cycle requires two clock cycles. However, bus masters are permitted to generate EISA burst cycles which require only one clock per transfer after the first cycle. The burst transfer cycle allows a master running at the full data rate to transfer one 32-bit data element on every rising edge of the bus clock (BCLK), whose frequency is typically 8 to 8.3 MHz. At an 8.3 MHz BCLK frequency, the computer system can burst transfer data with up to a 33 megabytes per second transfer rate.

The EISA standard has recently been extended to include two new burst transfer modes called the enhanced master burst (EMB) transfer modes. The first extension, known as the EMB66 protocol, provides up to a two-fold increase in the data transfer rate when compared to existing EISA bus master burst rates while maintaining the existing bus clock frequency. The second extension, known as the EMB133 protocol, provides up to a four-fold increase in data transfer rate. The two-fold performance increase in the EMB66 protocol is achieved by transferring one 32-bit data element on each of the rising and falling edges of the BCLK, thus transferring up to 66 megabytes per second.

The EMB133 protocol extends this performance improvement one step further by transferring 64-bits of data on each of the rising and falling edges of BCLK. The EMB133 protocol uses the EISA address and byte enable lines for data transfer in addition to the existing data bus to effectively increase the width of each EISA data transfer from 32-bits wide to 64-bits wide. As all data operandi consist of 64 bits in the EMB133 mode, the EMB133 transfer protocol can thus transfer burst cycles with up to 133 megabytes per second data transfer rate. As can be seen, the newly defined EMB extensions to the EISA bus specification provide for increasing the burst transfer rate of EISA bus masters.

Since data are transferred twice as fast in the EMB66 mode, a need exists for a clock generator that can automatically multiply the basic clock frequency to handle the increase in the data transfer rate and automatically return to the basic clock frequency upon completing the burst mode transfer. Further, since some circuits depend on the timing relationship with respect to the falling and/or rising edges of the basic clock, a need exists for a clock generator that can smoothly traverse the basic and the multiplied clock frequency while maintaining the edge alignments with respect to the basic clock.

SUMMARY OF THE INVENTION

The present invention smoothly multiplies the frequency of a computer's basic clock during a burst transfer cycle and smoothly resumes the basic clock frequency upon completing the burst transfer cycle by synchronizing its operation with a clock generated by a fixed frequency multiplier whose rising edges are aligned with the rising and falling edges of the basic clock and whose frequency is a multiple of the basic clock frequency. A decoder which operates synchronously with the fixed frequency multiplier clock detects the start and the end of the burst data transfer cycle by monitoring the address signals and control signals of the expansion bus. During the burst transfer cycle, the decoder toggles a speed-up signal. Since the decoder is clocked by the output of the fixed frequency multiplier, the speed-up signal operates synchronously with the rising edges of the fixed frequency multiplier clock.

The speed-up signal and the basic clock are presented to a variable frequency multiplier. When the speed-up signal is not toggling, the variable frequency multiplier generates a clock signal which tracks the basic clock signal. When the speed-up signal is toggling, the variable frequency multiplier compares the speed-up signal with the basic clock and generates a clock whose frequency is a multiple of the basic clock frequency. Since the rising edge of the variable frequency multiplier clock is aligned with the rising and falling edges of the basic clock, the clock multiplication performed by the variable clock multiplier is achieved in a smooth manner such that the variable clock signal maintain a 50% duty cycle relative to the basic clock signal during its traversal to and from the multiplied clock frequency. Further, since the speed-up signal and the variable frequency multiplier is synchronous with the fixed frequency multiplier clock whose edges are aligned to the rising and falling edges of the basic clock, the variable frequency multiplier clock is also aligned with the edges of the basic clock.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
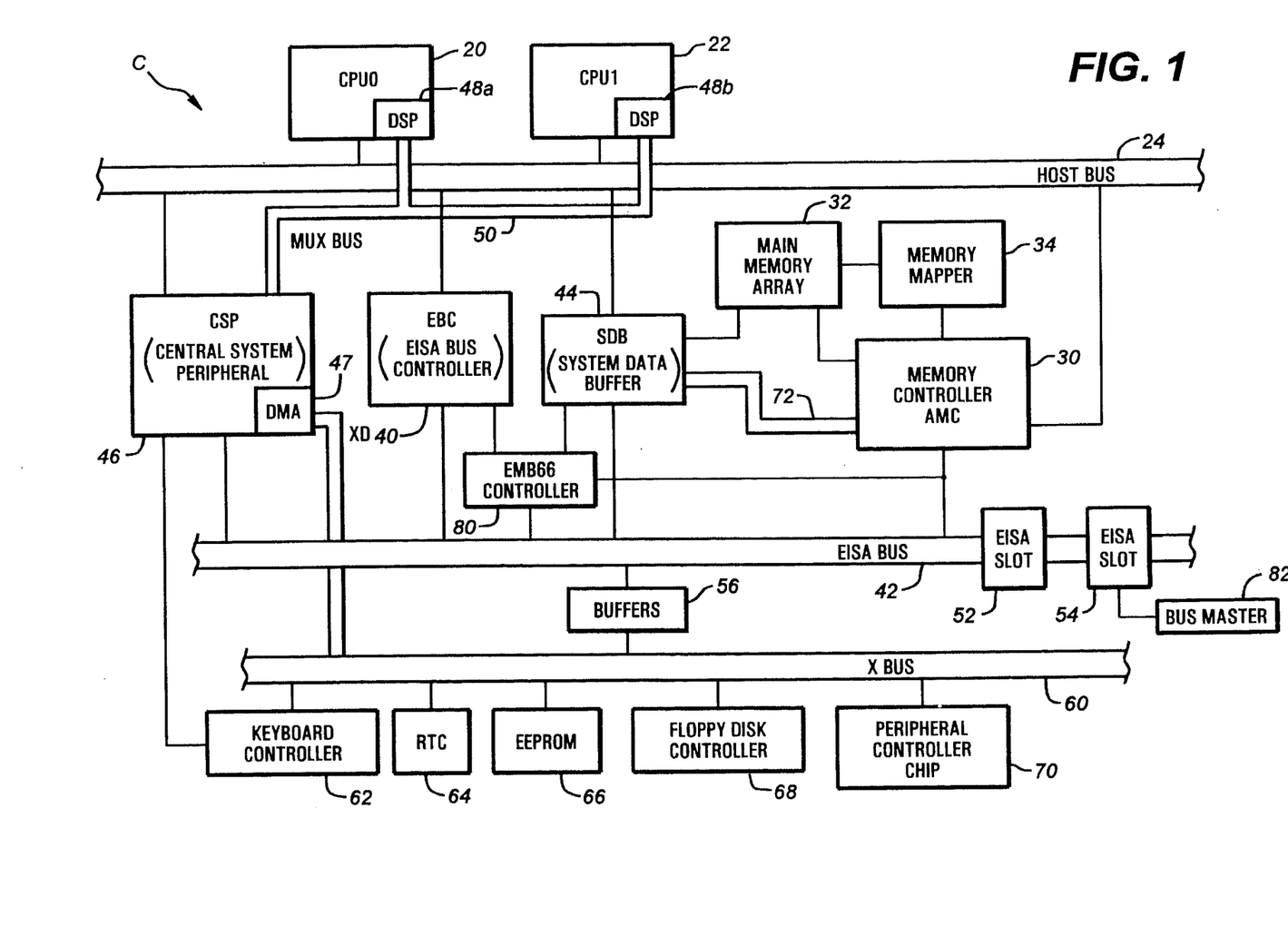
FIG. 1 is a block diagram of a computer system incorporating a variable frequency multiplier in accordance with the present invention.

Referring now to FIG. 1, a computer system C is shown incorporating an address signal predictor according to the present invention. The computer system C is preferably a multiprocessor system, although a computer system according to the present invention may include more processors or may be a single processor system. The elements of the computer system C that are not significant to the present invention, other than to illustrate an example of a fully configured computer system, are not discussed in detail.

The computer system C preferably includes two CPUs, referred to as CPU 20 and CPU 22, respectively, which are connected to a host bus 24. The host bus 24 preferably includes a host clock signal referred to as HCLK, which is preferably approximately 25 MHz or 33 MHz depending upon the desired speed of the computer system. In the preferred embodiment, CPU 20 is logically assigned the position of CPU0, and CPU 22 is assigned logical CPU1, although these assignments are preferably programmable and may be changed. A memory controller 30 is coupled to the host bus 24 to an expansion bus 42, where the expansion bus 42 is preferably the Extended Industry Standard Architecture (EISA) bus, although other types of expansion buses are contemplated. The memory controller 30 is also coupled to a main memory array 32, where the memory array 32 preferably comprises dynamic random access memory (DRAM). A data destination facility (DDF), otherwise known as memory mapper logic 34, is coupled to the memory controller 30 and the memory array 32, and provides memory mapping functions to facilitate memory accesses to the memory array 32. The memory mapper 34 is used in the preferred embodiment to generate a signal HLOCAL*, which is asserted low when an address appearing on the host bus 24 is to the memory array 32. An asterisk at the end of a signal name denotes negative logic where the signal is asserted low and negated high.

The CPUs 20 and 22 preferably include cache memory and write back cache subsystems (not shown) which are preferably implemented to follow a modified exclusive shared invalid (MESI) protocol, where each of the cache subsystems may be the exclusive owner of data which was originally read from the memory array 32. The CPUs 20 or 22 may modify the data within its cache memory so that the new data is not the same as the data in the corresponding memory location in the memory array 32. The CPU 20 or 22 is then the exclusive owner of the data at that particular memory address and is responsible for maintaining the correctness of the data provided in any future read operations to that address. Also, the owner CPU must inform the other CPU having data from the corresponding data address of the cycle so that the other CPU can determine that its data is now valid.

Thus, if one of the CPUs 20 or 22 attempts to access data from the memory array 32 that is dirty, the owner CPU detects this read request, causes the other CPU that is on the host bus 24 to temporarily abort its access and the owner CPU 22 updates or writes-back the owned data to the memory array 32. In the preferred embodiment, the write-back is to an entire line of data, where each line is preferably 256 bits. Thus, read or write accesses initiated on the EISA bus 42 should be run on the host bus 24 for two purposes. First, to perform a DDF snoop cycle so the memory mapper 34 can indicate whether the EISA address is to the memory array 32, and also to satisfy the write-back protocol of the CPUs 20 and 22.

The computer system C includes an EISA bus controller (EBC) 40, which is coupled between the host bus 24 and the EISA bus 42. The EBC 40 provides various bus cycle translation and conversion functions to facilitate transfers between the host bus 24 and the EISA bus 42. A system data buffer (SDB) 44 is coupled to the host bus 24, the EISA bus 42, the memory controller 30 and the memory array 32. The connection between the SDB 44 and the memory controller 30 is preferably a memory bus 72, which includes 144 bits preferably comprising 128 data bits and 16 error check bits. The SDB 44 buffers and transfers the data between the host bus 24 and the memory array 32, between the host bus 24 and the EISA bus 42, and between the EISA bus 42 and the memory array 32.

An Enhanced Master Burst (EMB) controller 80 is connected to the EBC 40, the EISA bus 42, the SDB 44 and the memory controller 30 to detect the beginning and end of an EMB burst transfer mode and appropriately multiply the SDB clock to accept data transmitted on both edges of the BCLK signal of the EISA bus 42. Based on the initial address signals from the EISA bus 42, the EMB controller 80 predicts the address signals during consecutive cycles of the burst transfer cycle and provides the predicted address signals in advance to the memory controller 30 so that the tight timing requirements of the EMB transfer mode can be satisfied. Further, the EMB controller 80 automatically increments the lower address signals, preferably LA<4..2>, to properly direct the transfer of the second 32-bit data in the EMB mode.

A logic block referred to as the central system peripheral (CSP) 46 is coupled between the host bus 24 and the EISA bus 42. The CSP 46 is coupled to logic blocks referred to as the distributed system peripherals (DSPs) 48a and 48b in the CPUs 20 and 22, respectively, through a multiplexed (MUX) bus 50. The operation of the MUX bus 50 is described in more detail in the related co-pending application Ser. No. 07/955,482, entitled MULTIPLEXED COMMUNICATION PROTOCOL BETWEEN CENTRAL AND DISTRIBUTED PERIPHERALS IN MULTIPROCESSOR COMPUTER SYSTEMS, filed Oct. 2, 1992, which is hereby incorporated by reference. The CSP 46 and the DSPs 48a and 48b are disclosed in more detail in related co-pending application Ser. No. 07/955,683, entitled ARRANGEMENT OF DMA, INTERRUPT AND TIMER FUNCTIONS TO IMPLEMENT SYMMETRICAL PROCESSING IN A MULTIPROCESSOR COMPUTER SYSTEM, filed Oct. 2, 1992, which is hereby incorporated by reference. The CSP 46 is also coupled to a keyboard controller 62. The CSP 46 includes a direct memory access (DMA) controller 47 which is preferably implemented as a true EISA bus controller, and will be used to illustrate cycles initiated on the EISA bus 42 to the host bus 24 accessing the memory array 32.

The EISA bus 42 includes a plurality of EISA slots 52 and 54 for receiving EISA expansion cards, such as network interface or hard disk interface cards for example. An EISA bus master 82 resides on one of the EISA expansion cards plugged into the EISA slots 52 and 54. The EISA bus 42 is coupled through buffers 56 to a bus referred to as the X bus 60. A number of peripheral devices are coupled to the X bus 60, including the keyboard controller 62, a real time clock (RTC) 64, an electrically erasable programmable read only memory (EEPROM) 66, a floppy disk controller 68, and a peripheral controller chip 70 which includes numerous parallel ports and UARTS (universally asynchronous receiver/transmitters). The CSP 46 is coupled to an 8-bit data bus of the X bus 60 referred to as XD.

The DMA controller 47, preferably a true EISA bus controller, operates to move blocks of data to and from memory. Its design and operation are well known in the industry and thus need not be explained here. The devices that are connected to the X-bus 60 such as the key board controller 62, the real-time clock RTC 64, the non-volatile EEPROM 66, the floppy disk controller 68, and the peripheral control chip 70 are similarly all standardized peripherals well known in the industry. As one skilled in the art knows, the peripheral devices for personal computers conform to a standardized architecture. These devices are configured to be at particular memory locations accessible by the CPU. These addresses are defined in the EISA Specification, for example. Thus, each peripheral can be individually selected and data can be transmitted between it and the CPU using standard techniques. For instance, the keyboard controller transmits key closure data from the keyboard to the CPU for further processing. The real-time clock maintains time and date information and transmits them upon request to the CPU. The EEPROM maintains the BIOS used when the computer is rebooted and which contains certain core functions. The floppy disk controller receives disk access commands from the CPU and controls the disk drive to retrieve the requested information to the CPU. The peripheral control chip transfers data between various serial and parallel ports and the CPU. Again, these devices and their implementation are well known to one skilled in the art.

Figure 2:
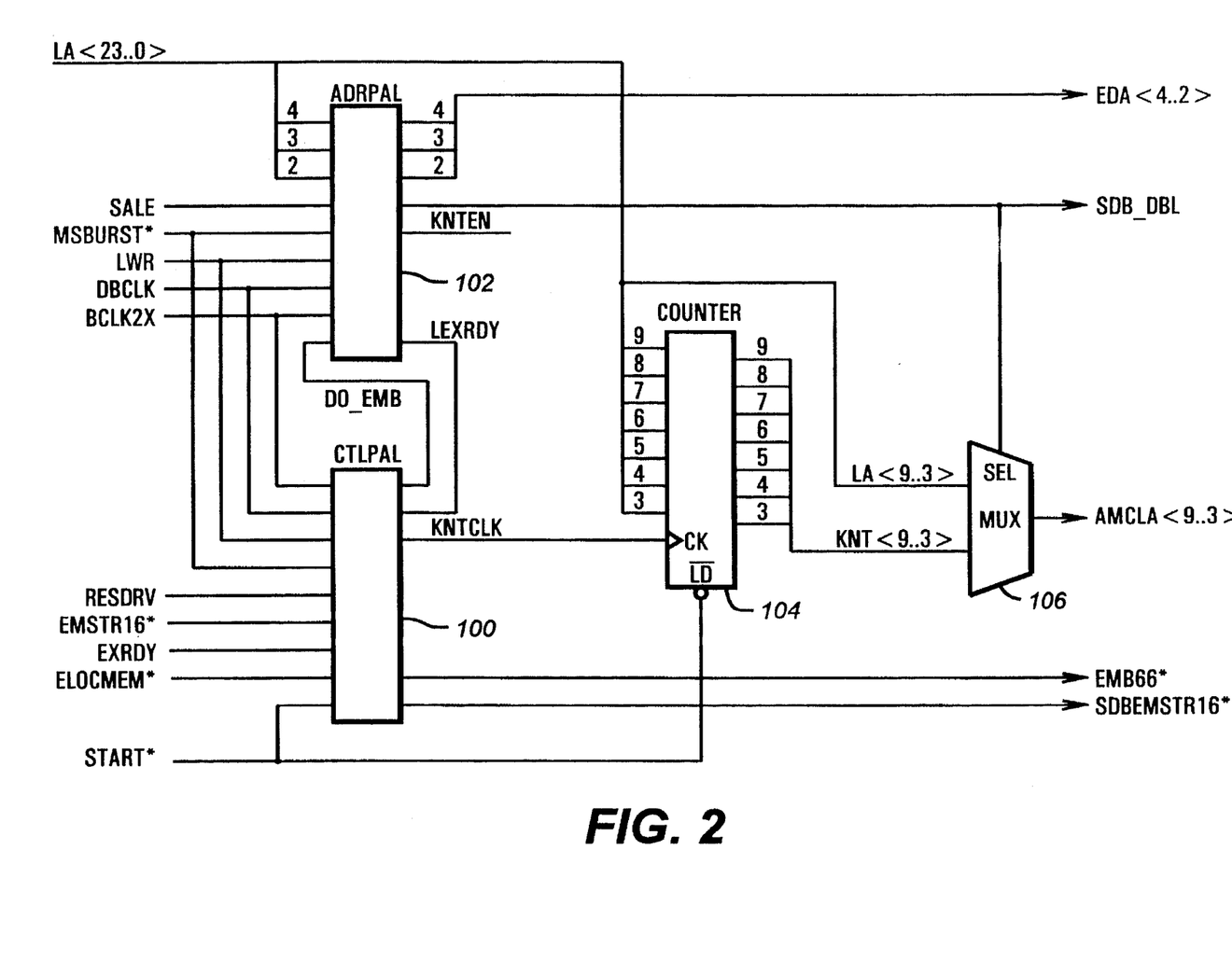
FIG. 2 is a schematic diagram of an address signal predictor operating in conjunction with the variable frequency multiplier of FIG. 1.
Figure 3:
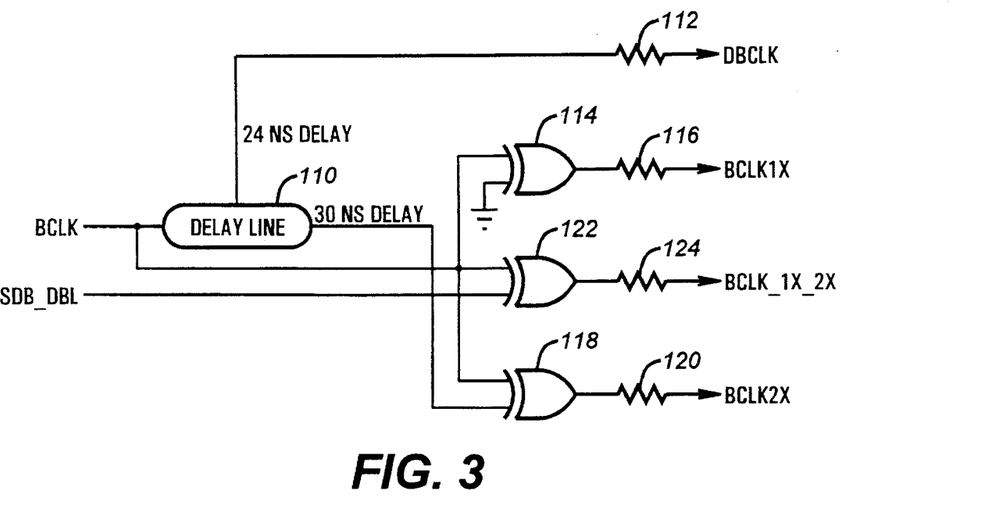
FIG. 3 is a schematic diagram of the variable frequency multiplier which provides clock signals to the address signal predictor of FIG. 2.

The address signal predictor for the EMB burst transfer mode is shown in greater detail in FIGS. 2 and 3. Turning to FIG. 2, the circuit to predict portions of the expansion bus address lines during consecutive cycles is disclosed. In the preferred embodiment, the decoder for detecting the start and end of the EMB cycle is implemented using two programmable array logic (PAL) devices: a control PAL 100 and an address PAL 102. The control PAL 100 receives as inputs the signals named MSBURST*, LWR, DBCLK, BCLK2X, RESDRV, EMSTR16*, EXRDY, ELOCMEM*, and START*.

The MSBURST* input to control PAL 100 comes from an EISA CPU or a bus master and is sampled on the rising edge of BCLK by the slave device. This signal is asserted to indicate to the slave, typically a memory system, that the CPU or bus master can provide the burst cycles. MSBURST* is asserted with the latched address lines LA<31..2> for the second and all subsequent cycles of the burst cycle.

LWR is a latched version of the write/read signal from the EISA bus. When LWR is at a logic high, the signal indicates that a write operation is being performed. When low, LWR indicates that the read signal is being performed.

DBCLK is a delayed clock signal which is a delayed version of BCLK from the EISA bus 42. In the preferred embodiment, this delay is preferably 24 nanoseconds, with the BCLK period being 120 nanoseconds. BCLK2X is a clock signal which is twice the frequency of BCLK. DBCLK and BCLK2X are generated by the clock multiplier of FIG. 3.

EXRDY is another signal from the EISA bus 42. This signal is negated by an EISA I/O or memory slave when additional wait states are required by the slave device. The master device samples EXRDY on each falling edge of BCLK after the master has asserted a CMD signal to provide the timing control within the cycle. EXRDY is latched to generate LEXRDY.

ELOCMEM* is the local memory signal indicating that the current cycle is a local cycle, or a non-CPU cycle. When low, this signal indicates that the access is directed to the main memory array 32 and when high indicates that the access is directed to the EISA bus 42.

RESDRV is an EISA signal which causes a hardware reset of ISA and EISA expansion boards. RESDRV is asserted by the reset controller during the power-up or after a bus time out. It can also be asserted in software using a control register.

START* is an EISA signal which provides the timing control at the start of a cycle. The CPU or bus master asserts START* after the latched address bits LA<31..2> and the memory and I/O (M/IO) control signal becomes valid. The CPU or bus master negates START* on the rising edge of BCLK after one BCLK cycle time. EMSTR16* is a signal asserted when the bus master is an ISA device that is capable of supporting a 16-bit data transfer mode.

Under the EMB66 protocol, expansion boards implementing the EMB66 protocol initially default to the existing EISA bus master protocol until explicitly enabled during the boot process. The EMB66 protocol requires both the master and the slave to indicate support for the new protocols at the initiation of each burst transfer via EMB66*, which is assigned to a previously reserved pin on the EISA connector. EMB66* is an active low open collector signal which should be terminated through a pull-up resistor. The use of an open collector signal allows one signal line to be shared between the EISA master and the slave during the configuration handshake. Control PAL 100 controls the EMB66* signal, which is a bidirectional signal which is connected to the EMB66* line of the EMB-capable EISA bus 42 to indicate that the master can support the EMB66* protocol.

DO_EMB, a signal presented to address PAL 102 by the control PAL 100, indicates that the system is performing an EMB mode transfer. The LEXRDY output, which is presented to control PAL 100, is a latched version of EXRDY from the EISA bus 42. The SDB_EMSTR16* signal is an output going to the SDB 44 to limit sampling to certain proper times.

Control PAL 100 also generates a count clock KNTCLK for incrementing the address prediction counter 104. The states of KNTCLK are determined by the state machine of FIG. 7, as explained shortly below.

Turning to the address PAL 102, the address PAL 102 receives as input the latched address bits LA<4 2>, SALE, MSBURST* LWR, DBCLK, BCLK2X, DO_EMB, and LEXRDY signals.

SALE is the system address latch enable signal which is asserted whenever PSALE is asserted. SALE is asserted while BCLK is asserted and CMD* is asserted during EISA master and the DMA burst cycles to latch the address lines LA<4..0> and the system byte enable signals SBE* for the SDB 44. PSALE is the partial SA latch enable signal which allows the LA addresses to flow through the SA bus. The timing of this signal is the same as the bus address latch enable signal BALE for the host CPU and the EISA bus master cycles.

The address PAL 102 receives the latched address lines LA<4..2> and generates the EISA data address bus signal EDA<4..2>, which are the latched EISA address bits to be used by the SDB 44. Specifically, bit 2 of the EDA bus is used to select the appropriate 32-bit data from a host to EISA write latch for a CPU to EISA write transfer and to store data in the appropriate 32-bit location of a host to EISA read latch for a CPU to EISA read transfer. For an EISA/ISA or DMA to host memory write transfer, bit 4 of the EDA bus is used to select either the low 128 bit or the high 128 bit section of a EISA to memory write preliminary latch, while EDA bits 3 and 2 are combined with the byte enable signals XBE<3..0> to determine which of the 16 byte locations in the section will store the data. For an EISA/ISA or DMA to host memory read transfer, bits EDA<4..2> are used to read the data from a EISA to memory read primary latch.

As shown in FIG. 2, an address PAL 102 generates the EISA data address bus EDA<4..0> which is a predicted version of the latched address lines LA<4..0>. These signals are presented to the SDB 44 to provide the address associated with the transferred data. As explained earlier, because the latched address line LA2 from the EISA bus does not properly reflect the address of the second 32-bit data, the address PAL 102 automatically increments the address line LA2 so that the second 32-bit word can be properly routed through the SDB 44. The address PAL 102 also generates the speed-up signal SDB_DBL to enable the multiplication of the BCLK frequency going to the SDB 44.

The address PAL 102 also generates KNTEN which couples the latched address lines LA<9..3> to be connected to the memory controller's latched address lines AMCLA <9..3>. When KNTEN is asserted, the multiplexer 106 connects the output of the counter 104 to the address lines of the memory controller latch addresses AMCLA<9..3>.

The address prediction counter 104 loads the latched address lines LA<9..3> as inputs upon the assertion of START*. The counter is clocked by KNTCLK from control PAL 100 and the output of the counter 104 is the bus KNT<9..3> which is provided to a multiplexer 106. Preferably the multiplexer 106 is a QST3383 bus exchange switch from Quality Semiconductor and others to have a very small internal propagation delay and allow bidirectional operation of the address lines. The other input of multiplexer 106 is connected to the latched address lines LA<9..3>. The output of the multiplexer 106 is provided to the advanced memory controller latched address lines AMCLA<9..3>. When the count enable signal KNTEN from the address PAL 102 is deasserted, the multiplexer provides the latched address lines LA<9..3> to AMCLA<9..3>. Conversely, when KNTEN is asserted, KNT<9..3> are provided to AMCLA<9..3>. In this manner, the predicted address bus lines are provided in advance to the memory controller 30 so that the appropriate timing requirements are satisfied even with the tighter margin requirement of the EMB cycle.

Turning now to FIG. 3, the clock multiplier circuitry to generate the double speed clock signal BCLK2X from the bus clock BCLK is disclosed. FIG. 3 also discloses in more detail the variable frequency multiplier which can switch from the BCLK frequency to the multiplied frequency BCLK2X on-the-fly.

Before discussing the frequency multiplier circuit for BCLK, a discussion of BCLK is deemed appropriate. On the EISA bus 42, control signals, address lines, and data bus use a bus clock BCLK generated by the system board as the reference for a transfer. The trailing of START* and the leading edge of CMD*, which provide timing controls within the cycle, are always synchronous with BCLK. Under the specification, BCLK operates at a frequency of between 4 MHz and 8.333 MHz, with a normal duty cycle of 50%. In the preferred embodiment, BCLK is generated by the EISA bus controller 40 at a frequency of 8.333 MHz. The BCLK period can be extended for synchronization to the main CPU or other system board devices if necessary.

As shown in FIG. 3, the BCLK input from the EISA bus controller 40 is presented to a delay line 110 having multiple taps, preferably one tap with a delay of 24 nanoseconds (ns) and another tap with a delay of 30 ns. The 24 ns delay tap is connected to the input of a damping resistor 112, whose output is the delayed BCLK signal, DBCLK. The damping resistor 112 is used to minimize the transients and reflections generated as a result of driving a heavy electrical load.

BCLK is presented to one input of each of exclusive-OR (XOR) gates 114, 118 and 122. The XOR gates 114, 118 and 122 are low output skew buffers for clock distribution and clock generation applications. In the preferred embodiment, a quad XOR clock buffer device called the CDC328A from Texas Instruments of Dallas, Tex., is used. The XOR gate 114 generates BCLK1X, which is a version of BCLK. This is achieved by grounding the other input to the XOR gate 114. The output of the XOR gate 114 is connected to a damping resistor 116 whose output is presented to the computer system as the clock signal BCLK1X.

The inputs to the XOR gate 118 are the BCLK and the delayed version of BCLK, which is delayed by one quarter of the BCLK wavelength, or the 30 ns tap of delay line 110. The 30 ns delay tap is delivered to the remaining input of the XOR gate 118 to generate BCLK_2X, the double frequency version of BCLK. The operation of the frequency doubling of the XOR gate 118 is illustrated in the timing diagram of FIG. 4.

Figure 4:
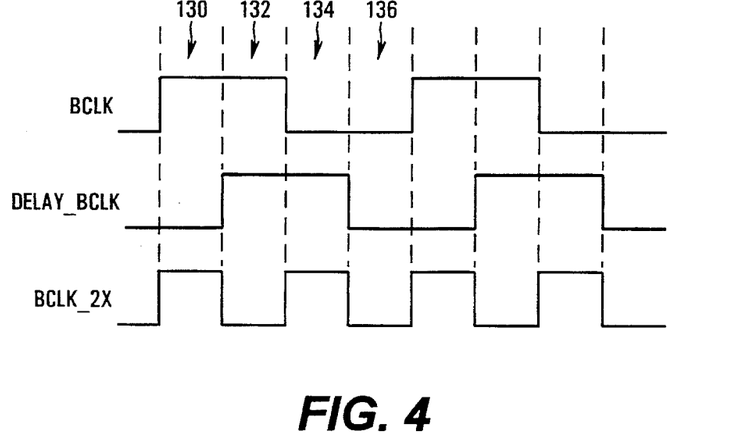
FIG. 4 is a timing diagram illustrating the outputs from the variable frequency multiplier of FIG. 3 and their timing relationships.

Referring now to FIG. 4, in period 130, the BCLK is a logic high, while the delayed version is a logic low. Because the inputs to the XOR gate 118 are not equal, the output of XOR gate 118 goes high. In period 132, because both inputs of the XOR gate 118 are high, the output of the XOR gate 118 goes low. In period 134, the output of the XOR gate 118 goes high because its inputs are not the same. In period 136, the output of the XOR gate 118 goes low once more because its input are both low. Thus, the application of BCLK and its quarter wavelength delayed version to the XOR gate generates an output having a frequency that is twice the input frequency and whose output has rising edges aligned to the rising and falling edges of BCLK1X. The output of the XOR gate 118 is connected to a damping resistor 120 to generate BCLK2X.

The variable frequency multiplier, the XOR gate 122, is used to switch from BCLK to the doubled frequency version of BCLK on-the-fly. When SDB_DBL is not toggling, the frequency of the output of the XOR gate 122 is the same as the frequency of BCLK. When SDB_DBL is toggled, the output of the XOR gate 122 is twice the frequency of BCLK.

Figure 5:
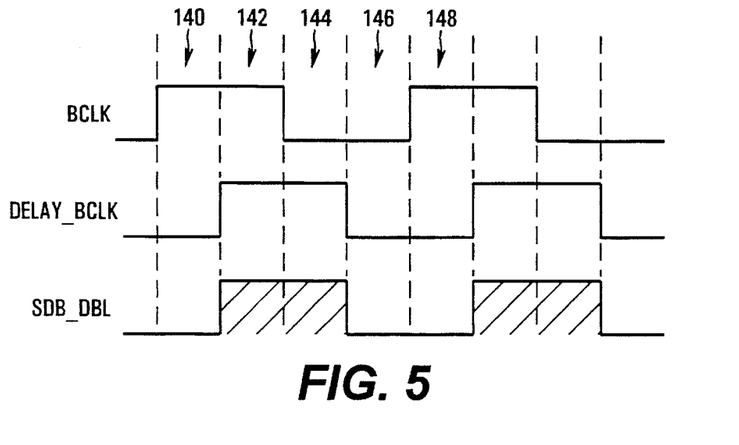
FIG. 5 is a timing diagram illustrating the relationship between the speed-up signal of FIG. 2 and the outputs from the variable frequency multiplier of FIG. 3.

Turning to FIG. 5, the timing relationship of the speed-up signal SDB_DBL of FIG. 3 and BCLK and DELAY_BCLK is shown. As seen in FIG. 5, SDB_DBL is aligned with the active window of the delayed BCLK. In periods 140, 146 and 148, when the delayed BCLK signal is low, SDB_DBL is also low. During periods 142 and 144, if SDB_DBL toggles, the frequency of BCLK can be doubled. However, if SDB_DBL remains low, the output of XOR gate 122 merely tracks BCLK. Thus, depending on SDB_DBL, the frequency of the output of the XOR gate 122 can either be the BCLK frequency or two times the BCLK frequency. The output of the XOR gate 122 is connected to a damping resistor 124 to generate the variable clock signal BCLK_1X_2X. Thus, the application of BCLK and the speed-up signal SDB_DBL to an XOR gate generates an output having a frequency that is twice the input frequency and whose output has rising edges aligned to the rising and falling edges of BCLK1X.

Figure 6:
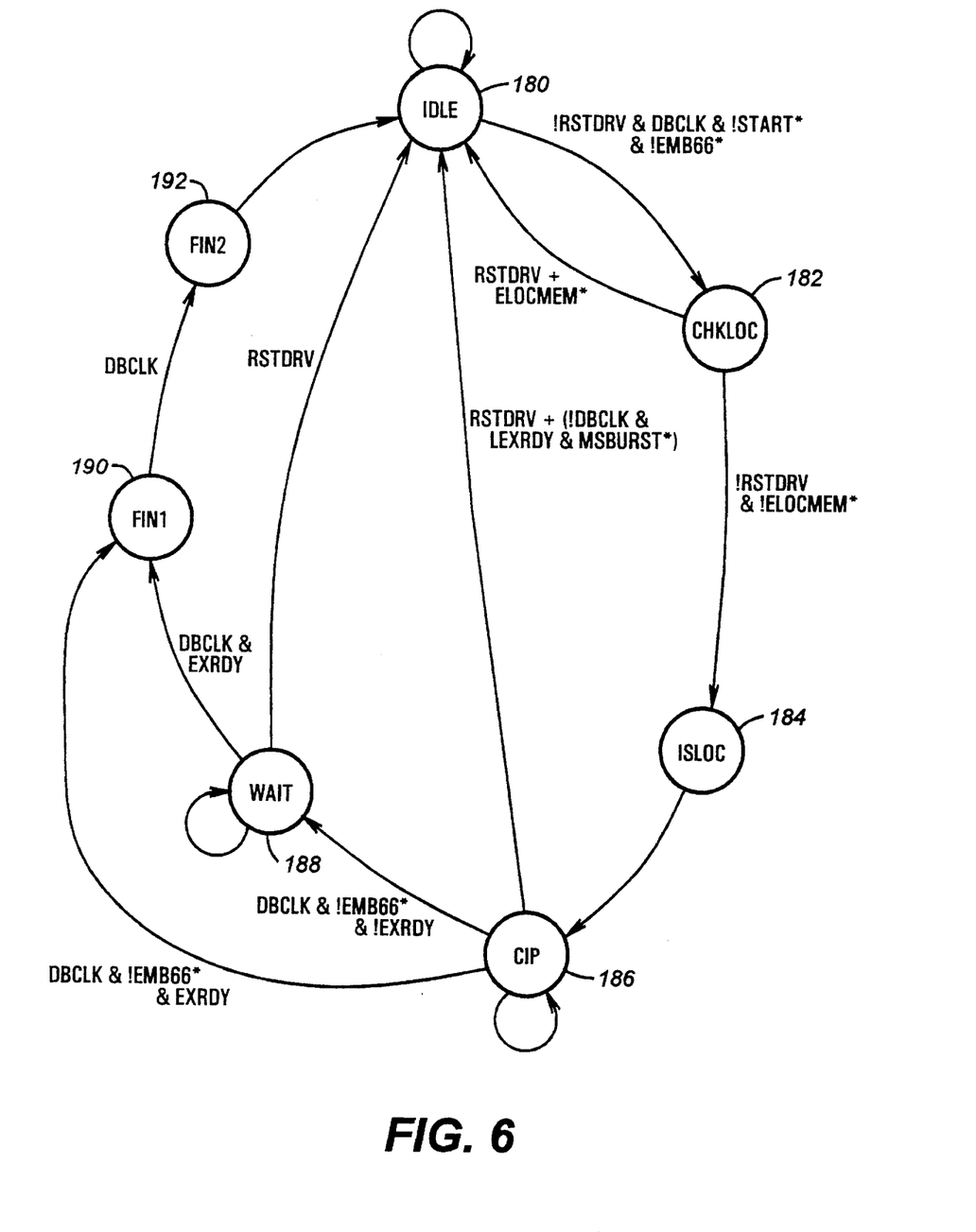
FIG. 6 is a state machine diagram for a burst cycle tracker machine.

FIG. 6 discloses a state machine which tracks the EMB cycle. As shown in FIG. 6, seven states are used to track the EMB cycle. The state machine is clocked by BCLK2X. Upon reset or power-up, the state machine, which in the preferred embodiment resides in the control PAL 100, enters the IDLE state 180. If RSTDRV is deasserted; DBCLK is asserted; START* is asserted, as indicated by the inverse of the START* signal (!START*) being high; and EMB66* is asserted, as indicated by !EMB66* being high, the state machine transitions from state IDLE 180 to state CHKLOC 182.

Once in state CHKLOC 182, if either RSTDRV is asserted or ELOCMEM* is deasserted, the state machine transitions back to the IDLE state 180. On the other hand, if RSTDRV is deasserted and ELOCMEM* is asserted, the state machine transitions from the CHKLOC state 182 to the ISLOC state 184. On the next clock, the state machine transitions from the ISLOC state 184 to a CIP or cycle in progress state 186.

In the CIP state 186, if RSTDRV is asserted or the combination of DBCLK is deasserted, LEXRDY is asserted and the MSBURST* is deasserted, the state machine transitions from state CIP 186 to the IDLE state 180. While in the CIP state 186, if DBCLK is asserted, EMB66* is asserted and EXRDY is deasserted, the state machine transitions from the CIP state 186 to a WAIT state 188. Otherwise, if while in the CIP state 186, DBCLK is asserted, EMB66* is asserted, and EXRDY is asserted, the state machine transitions to a state FIN1 190.

While in the WAIT state 188, if DBCLK is asserted and EXRDY is asserted, the state machine transitions from state WAIT 188 to state FIN1 190. If, while in the WAIT state 188, RSTDRV is asserted, the state machine transitions from the WAIT state 188 to the IDLE state 180.

While in the FIN1 state 190, if DBCLK is asserted, the state machine transitions from the state FIN1 190 to state FIN2 192. Once in state FIN2 192, the state machine transitions in the next clock cycle to the IDLE state 180. As the EMB protocol is being transacted in states CIP, WAIT, FIN1 and FIN2, the DO_EMB output signal is asserted whenever the state is CIP, WAIT, FIN1 or FIN2.

Figure 7:
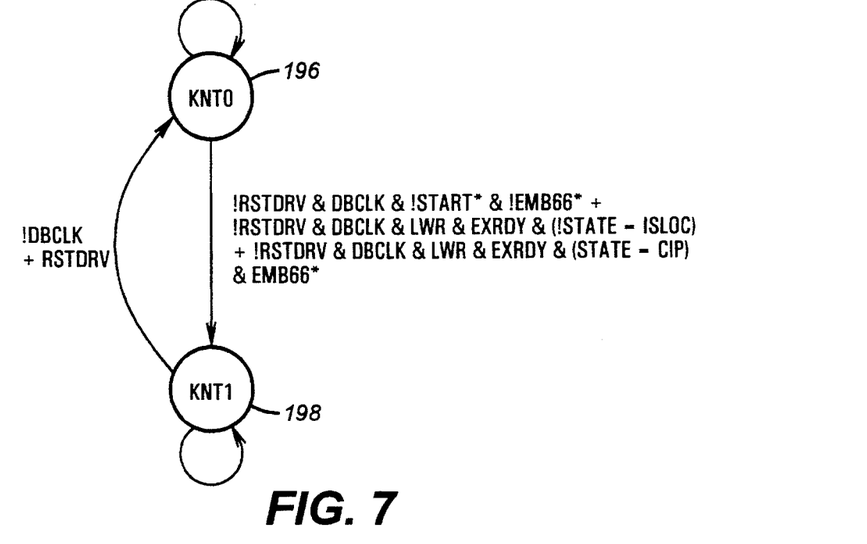
FIG. 7 is a state machine diagram for a count clock machine.

The state machine of the count clock, which controls the counter 104, also resides in the control PAL 100. The state machine for the count clock transitions synchronously with BCLK2X. As shown in FIG. 7, the state machine for the count clock has two states, KNT0 196 and KNT1 198. Upon reset, the state machine is at state KNT0 196. Once in the state KNT0 196, if RSTDRV is deasserted, DBCLK is asserted, START* is asserted, and EMB66* is asserted; if RSTDRV is deasserted, DBCLK is asserted, LWR is asserted, EXRDY is asserted, and the state is ISLOC; or if RSDRV is deasserted and DBCLK is asserted, LWR is asserted, EXRDY is asserted, the state is CIP and EMB66* is deasserted, the state machine transitions to state KNT1 198. The state machine remains in state KNT1 198 unless DBCLK is deasserted or RSTDRV is asserted, in which the state machine transitions back to state KNT0 196. In the preferred embodiment, the state KNT0 represents the deasserted state of KNTCLK and the state KNT1 represents the asserted state of KNTCLK. Thus, the value of KNTCLK for incrementing the address prediction counter 104 is determined by the state machine of FIG. 7.

The first term affecting the transition from state KNT0 to state KNT1 relates to the address loading of the counter 104. The counter 104 is loaded at the start of an EMB66 cycle, as clocked by the DBCLK clock signal. The second term evaluated in state KNT0 covers the initial data access cycle in the burst mode. The second term detects whether a write operation is being performed and whether the operation is a cycle to local or main memory 32 or not. Thus, if a write operation is directed to the main memory array 32, the counter 104 output is incremented on the rising edge of BCLK2X. The third term affecting the transition from state KNT0 to KNT1 addresses the continuing transfer of data after the initial data transfer in the burst mode.

Figure 8:
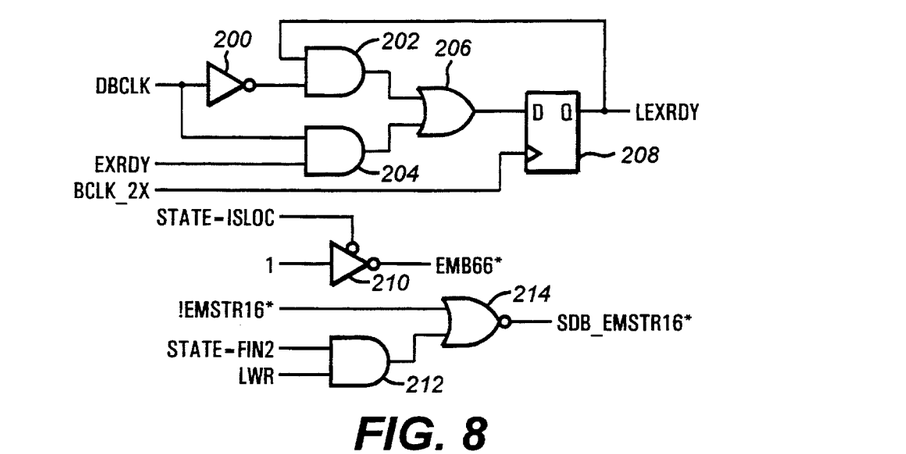
FIG. 8 is a schematic diagram of the circuits associated with the burst cycle tracker machine of FIG. 6.

FIG. 8 discloses in more detail the circuit to generate LEXRDY, EMB66*, and SDB_EMSTR16* from the control PAL 100. As shown in FIG. 8, DBCLK is presented to inverter 200, whose output is connected to an AND gate 202. The other input of the AND gate 202 is connected to the LEXRDY output of a D-type flip-flop 208. DBCLK is also connected to one input of an AND gate 204. The other input of the AND gate 204 is connected to EXRDY. The outputs of the AND gates 202 and 204 are connected to the inputs of an OR gate 206. The output of the OR gate 206 is connected to the input of the flip-flop 208. Flip-flop 208 is clocked by BCLK2X.

The EMB66* signal is provided by an inverting tri-state buffer 210, as shown in FIG. 8. The input to the buffer 210 is a logic high. The output of the buffer 210, is turned on when the state is ISLOC to drive the EMB66* line of the EMB-extended EISA bus 42. The negotiation between a master and a slave before entering the EMB cycle is performed by pulsing the EMB66* signal via the toggling of the buffer 210.

The generation of SDB_EMSTR_16* is discussed next. When the state is FIN2, and the latched write read signal LWR is asserted, the output of an AND gate 212 is asserted. The output of the AND gate 212 is connected to one input of a NOR gate 214. The other input of the NOR gate 214 is connected to !EMSTR16*. The output of the NOR gate 214 is SDB_EMSTR16*.

Figure 9:
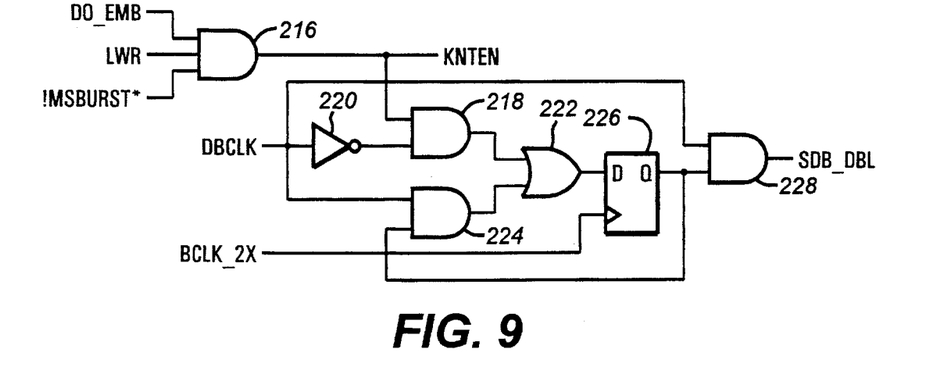
FIG. 9 is a schematic diagram of the circuits associated with the burst cycle tracker machine of FIG. 6.

FIG. 9 shows in more detail certain of the outputs generated by address PAL 102. Turning to FIG. 9, KNTEN is generated by ANDing DO_EMB, LWR, and !MSBURST* via an AND gate 216. KNTEN is connected to one input of an AND gate 218. The other input of the AND gate 218 is connected to an inverter 220 whose input is DBCLK. DBCLK is also connected to one input of an AND gate 224. The other input of the AND gate 224 is connected to the output of a D-type flip-flop 226. The output of the AND gates 218 and 224 are connected to the inputs of an OR gate 222, whose output is connected to the D input of the flip-flop 226. Flip-flop 226 is clocked by BCLK2X. The output of flip-flop 226 is connected to one input of an AND gate 228. The other input of the AND gate 228 is connected to DBCLK. The speed-up signal SDB_DBL is provided at the output of the AND gate 228. As can be seen, the speed-up signal SDB_DBL is asserted in phase with DBLCK.

As previously indicated, the address PAL 102 provides the EDA<4..2> signals. The following equation is used by the address PAL 102 for this purpose.

EDA<4..2>  :=  ! DO_EMB & DBCLK & SALE & LA<4..2>
           +   ! DO_EMB & (!DBCLK + !SALE) & EDA<4..2>
           +   DO_EMB & !MSBURST* & LEXRDY & (EDA<4..2> PLUS 1)
           +   DO_EMB & (MSBURST* + !LEXRDY) & EDA<4..2>

The first minterm is used to load the LA<4..2> signals at the start of an EISA cycle. The second minterm is the hold term used during an EISA cycle. The third minterm causes the EDA<4..2> signals to increment when LEXRDY is asserted and the rising edge of the BCLK2X signal, the clocking signal for this equation, occurs during an EMB cycle. The fourth minterm is the hold term during the EMB cycles. Thus the LA<4..2> values are stored at the EISA cycle which commences an EMB burst cycle and then incremented on each rising edge of the BCLK2X signal during the EMB cycle. During normal EISA or EISA burst cycles the LA<4..2> signals are loaded for each cycle.

The EMB66 transaction protocol is implemented in the preferred embodiment of the invention. An EMB66 cycle is a special case of the existing EISA bus burst cycle which requires that the transfer must start on a 32-byte paragraph boundary, the transfer must consist of an integer multiple of 32 bytes, the transfer can occur only if both the master and the slave indicate its ability to support EMB cycles.

Figure 10:
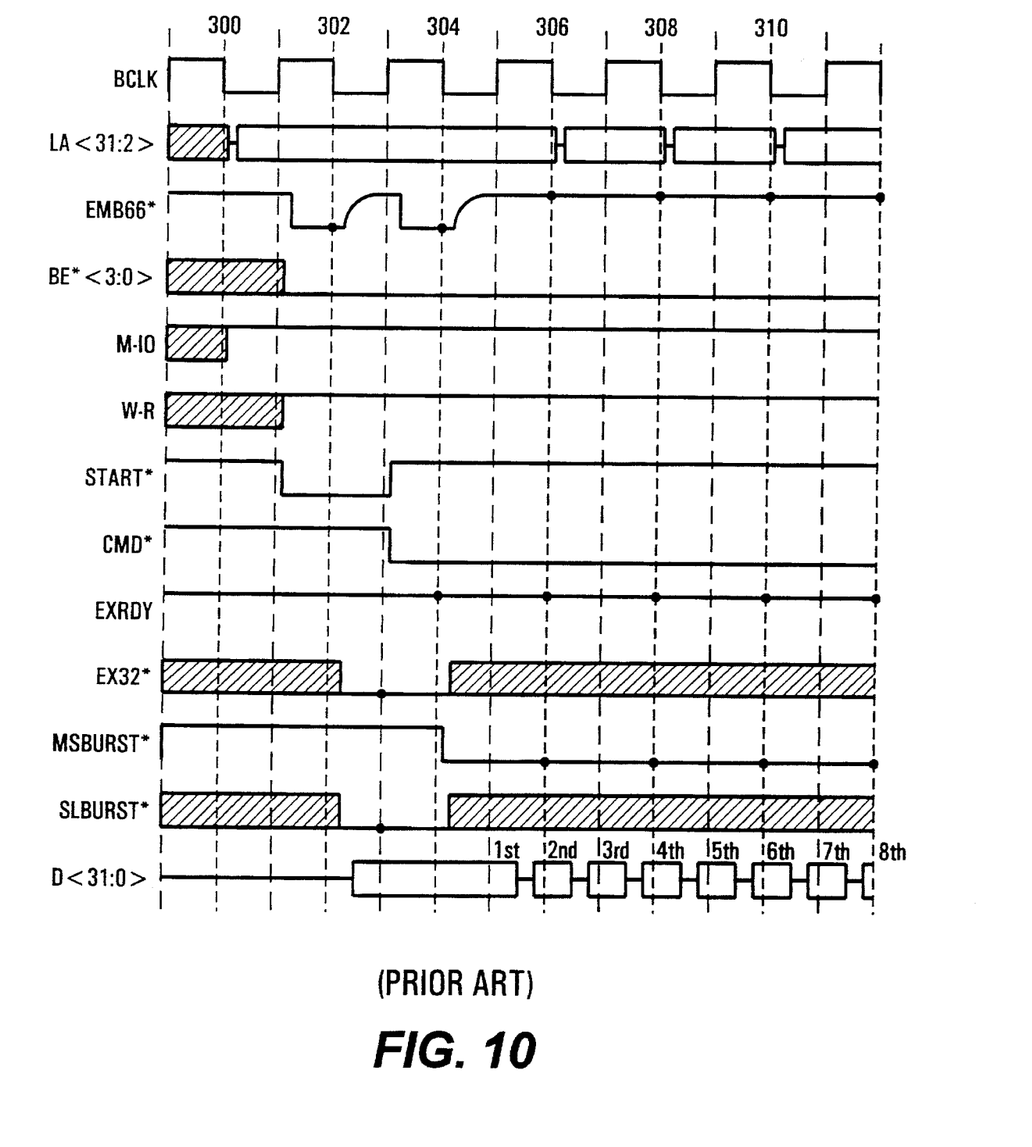
FIG. 10 is a timing diagram according to the prior art illustrating the initiation of an EMB66 burst transfer cycle for a write cycle with no wait state.

Turning now to FIG. 10, the timing diagram of the decoder in relationship to the EMB66 transaction protocol is discussed in more detail. FIG. 10 illustrates the EMB66 protocol timing diagram for the initiation of a write cycle with no wait state. As shown at time period 300 of FIG. 10, the EMB66 cycle begins like an existing EISA burst cycle with the EISA master presenting valid address and M-IO signals to indicate a memory or I/O operation, following by the assertion of the byte enable signals BE*<3..0> and the write-read signal W_R to indicate a write operation along with the assertion of START* which provides timing control at the start of a cycle. The CPU or bus master asserts START* after the addresses are latched and M-IO becomes valid.

In time period 302, the EMB66 master also indicates its desire to perform EMB66 cycles by asserting EMB66* along with START* to a slave device. After allowing time for sampling by the slave, the master floats EMB66*. Upon sampling the assertion of EMB66*, the EMB66 compatible slave asserts EMB66* after the rising edge of BCLK in time period 304 to indicate its ability to offer support to EMB66 cycle. An EMB66 cycle will follow only if both the master and the slave sample EMB66* asserted during the allocated sampling window. If either the master or the slave fails to assert EMB66*, the signal remains in the negative state as a result of the pull-up resistor. In this case, an existing EISA bus cycle will be performed.

In the event that EMB66 compatibility has been established, the slave will float EMB66* from the last falling BCLK edge. Finally, the master and slave are also required to use the MSBURST*, SLBURST* and EX32* handshakes as specified in the EISA specification for existing EISA burst cycles. EX32* indicates that the slave can support 32-bit transfers, while SLBURST* indicates that the slave supports the burst transfer feature. SLBURST* is sampled on the rising edge of BCLK by the main CPU, DMA controller, or a bus master. MSBURST* is asserted by an EISA bus master to indicate to the slave that the CPU or bus master can provide burst cycles. MSBURST* is asserted with the latched address lines for the second and all subsequent cycles of the burst and is sampled on the rising edge of BCLK by the slave.

Time periods 306, 308, and 310 show the transitions of various bus signals during an EMB mode. The EMB cycle must begin and end with address alignment on 32-byte boundaries. Specifically, the lower three EISA address lines, LA<2:4>, must be 0 when the address is presented with the assertion of START*, EMB66*, and BE*. If the data to be transferred is not aligned on a 32-byte address boundary, then existing EISA cycles must be used to reach such a boundary. Once a 32-byte address boundary is reached, the EMB66 cycle may then be used to transfer additional data as long as it resides within a 1024 byte page as defined by the EISA specification.

Figure 11:
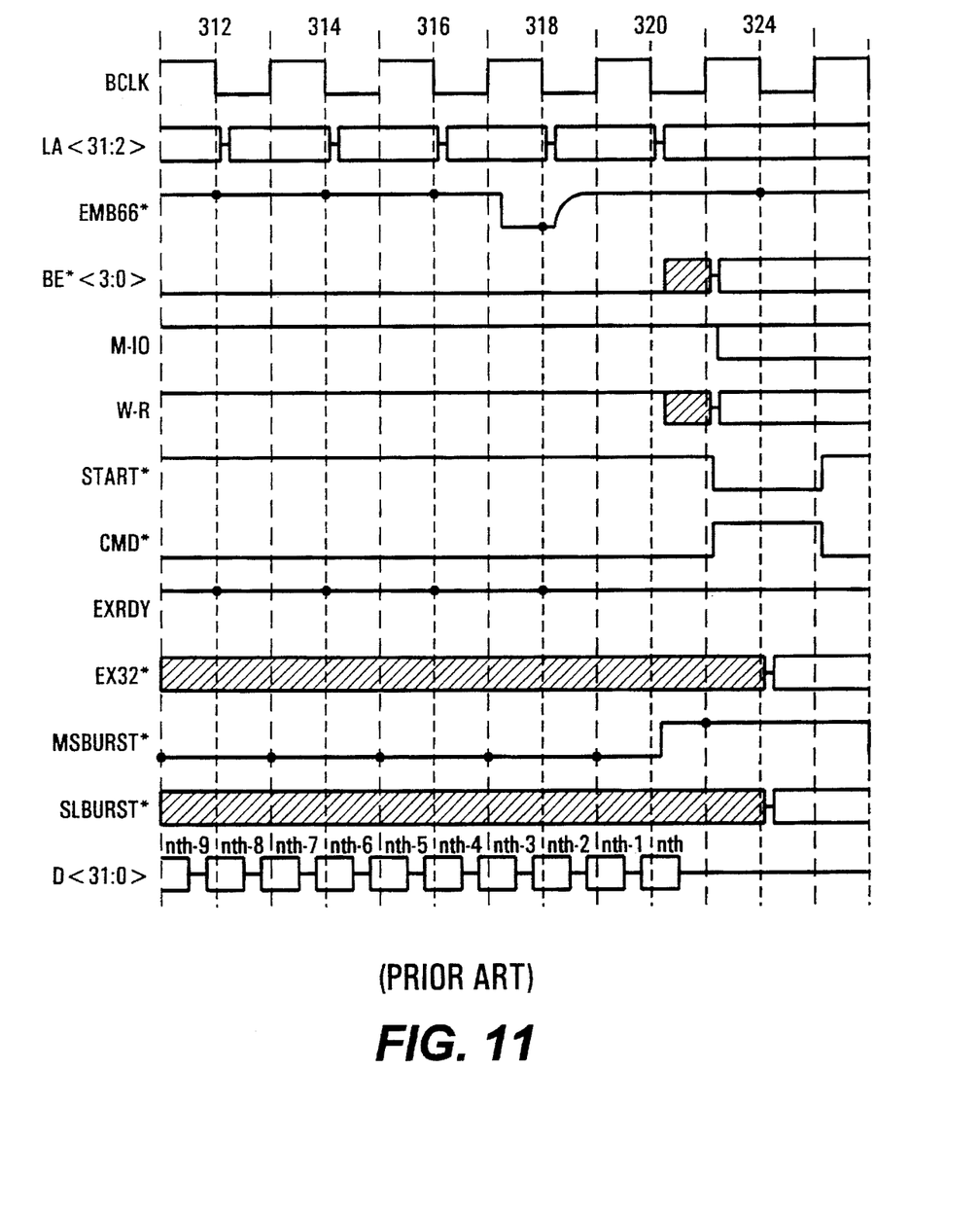
FIG. 11 is a timing diagram according to the prior art illustrating the termination of an EMB66 burst transfer cycle for a write cycle with no wait state.

FIG. 11 illustrates the EMB66 protocol timing diagram for the data transfer and the termination of the write cycle with no wait state. In time periods 312, 314 and 316, 32-bits of data are transferred on the rising and falling edges of BCLK. In time period 318, the master asserts EMB66* to indicate in advance that a data transfer sequence is about to terminate. The master does this by asserting EMB66* from the rising edge of BCLK that precedes the falling edge of BCLK upon which EXRDY will be first sampled for the last data pair. Hence, the slave samples EMB66* asserted on the same falling edge of BCLK that the master first samples EXRDY for the last data pair. If both EMB66* and EXRDY are asserted on the falling edge of BCLK, the master will terminate the cycle by negating MSBURST* in time period 320, which is one BCLK period later. The EMB66 read cycle is completed in time period 324.

Figure 12:
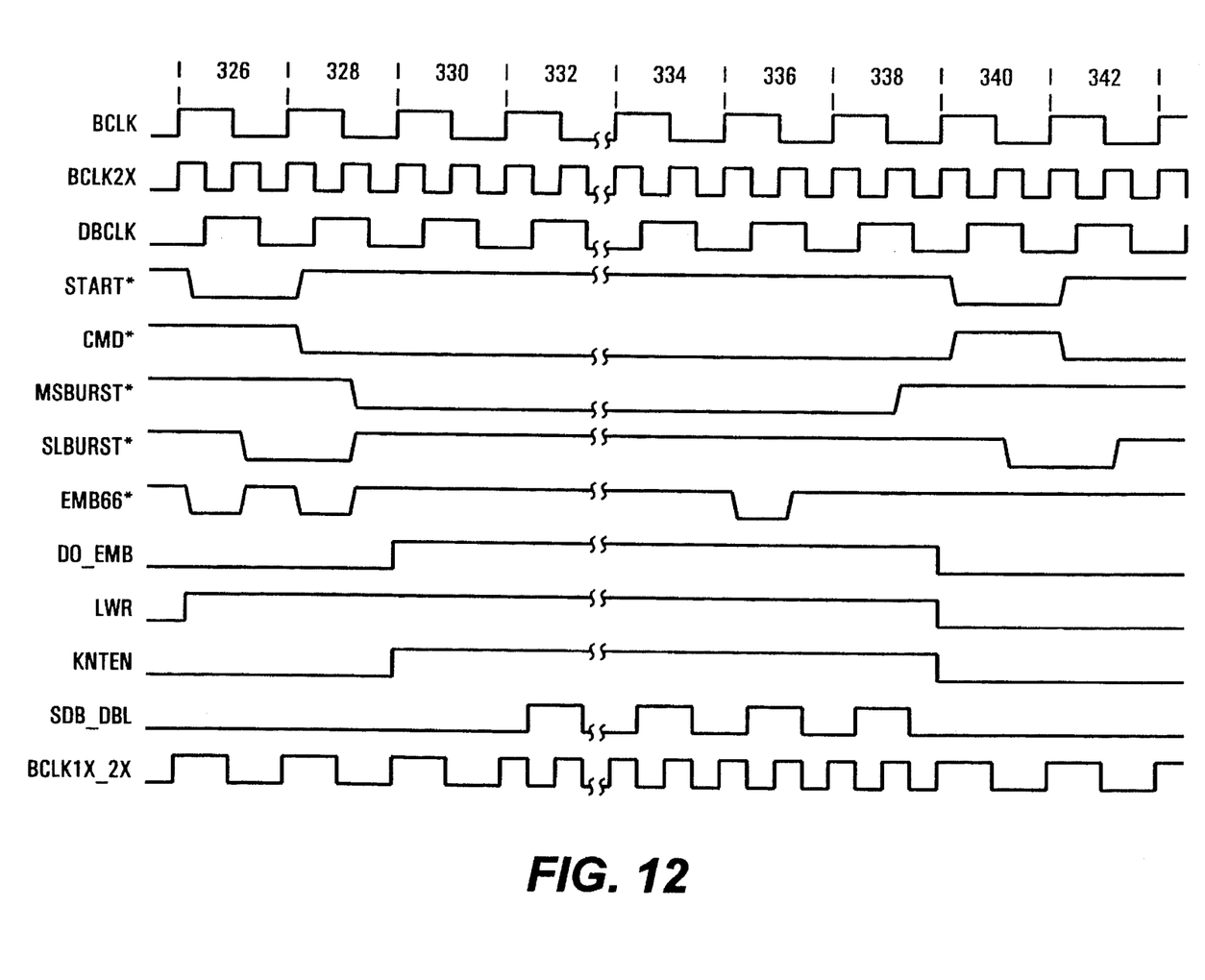
FIG. 12 is a timing diagram illustrating the relationship among the output of the variable frequency multiplier, the bus clock, and other bus control signals shown in FIGS. 10 and 11.
Figure 13:
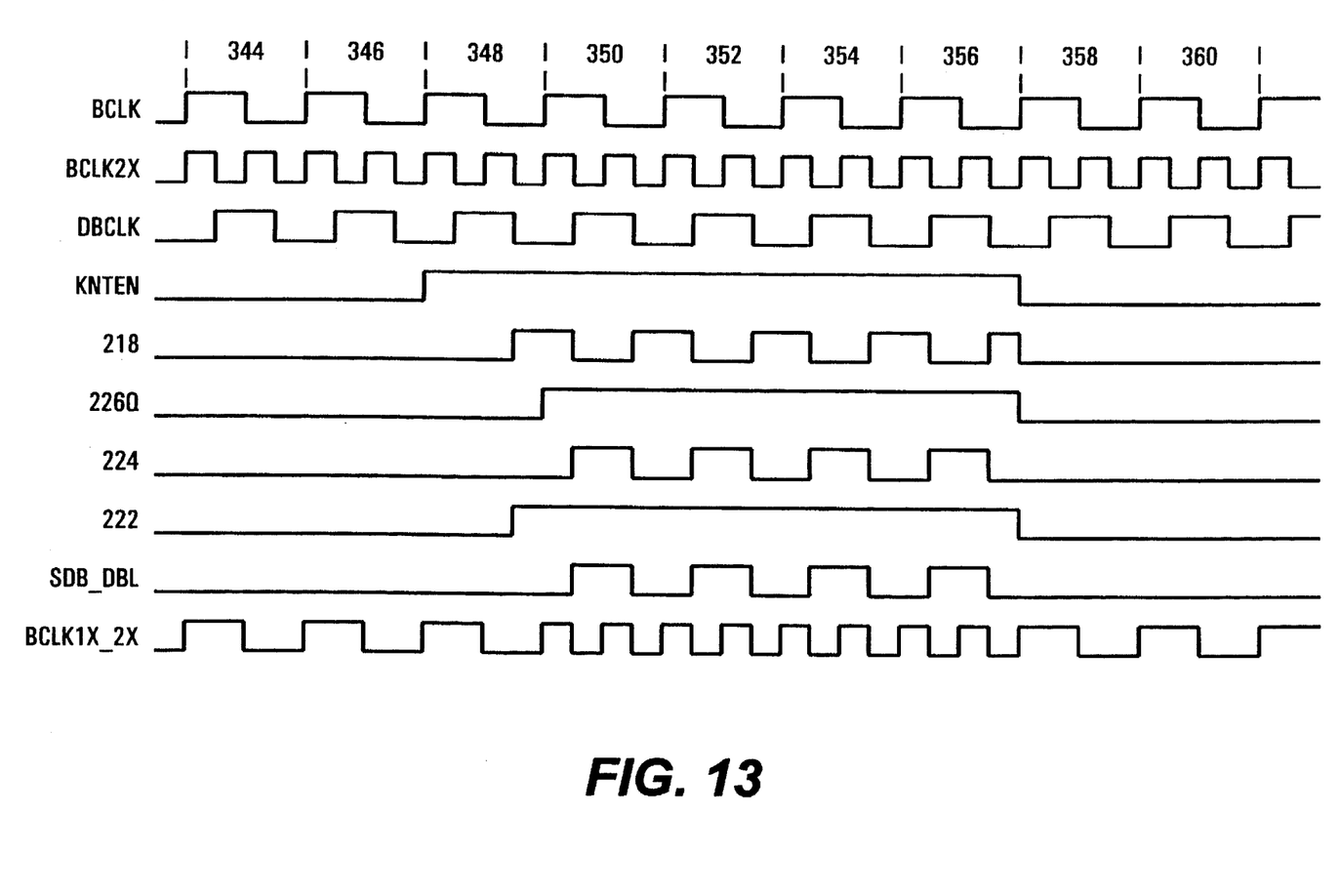
FIG. 13 is a timing diagram illustrating the timing relationships of the components in the variable frequency multiplier of FIG. 3.

The beginning and end of the EMB66 read cycle of FIGS. 10 and 11 are combined and illustrated in FIGS. 12 and 13, which disclose in more detail the relationship among the signals generated by the circuit in FIGS. 2 and 3 and the generation of the variable clock signal BCLK_1X_2X. Turning to FIG. 12, the master asserts START* and EMB66* in time period 326. In time period 328, the slave asserts EMB66* to establish compatibility with the master. In time period 330, DO_EMB and KNTEN are asserted indicating that an EMB transfer cycle is occurring. In time period 332, the speed-up signal SDB_DBL toggles to indicate that the frequency of BCLK is to be doubled. Data transfer continues on during and after time period 332.

In time period 336, the master asserts EMB66* to indicate the termination of the EMB66 transfer cycle. In time period 338, MSBURST* is deasserted, leading to the deassertion of DO_EMB and KNTEN in time period 340. The deassertion of KNTEN also causes SDB_DBL to stop toggling. Additionally, a new cycle starts in time period 340 with the assertion of START*. In time period 342, the cycle continues with the appropriate deassertion of START*, and the assertion of CMD* and SLBURST*.

As shown in FIG. 12, SDB_DBL is toggled when the computer is performing the burst transfer cycle. The toggling of SDB_DBL in turn causes BCLK_1X_2X to respond appropriately and to oscillate at twice the frequency of BCLK during the appropriate time period. Once the computer system terminates the burst transfer cycle, BCLK_1X_2X oscillates at its original BCLK frequency.

FIG. 13 shows in greater detail the generation of BCLK_1X_2X. FIG. 13 shows the bus clock signal BCLK, BCLK2X, DBCLK, KNTEN, the output of gate 218, the output of flip-flop 226, the output of gate 224, the output of gate 222, the speed-up signal SDB_DBL, and the variable clock signal BCLK_1X_2X. In time periods 344 and 346 of FIG. 13, the computer system is initiating an EMB transfer cycle. In time period 348, KNTEN is asserted indicating that an EMB transfer cycle is occurring. The output of gate 218 is asserted when DBCLK is deasserted. In time period 350, upon the rising edge of BCLK2X, the output of flip-flop 226 is asserted. Once the output of flip-flop 226 is asserted, the output of gate 224 is asserted when DBCLK is asserted. The outputs of gates 218 and 224 are logically ORed by gate 222. SDB_DBL is asserted when DBCLK is asserted and the output of gate 222 is asserted. SDB_DBL and BCLK are presented to XOR 122 gate to generate BCLK_1X_2X and cause the frequency to be multiplied upon command. In the preferred embodiment, the multiplication factor is two so that BCLK frequency is doubled. This process continues on in time periods 352, 354, and 356. In time period 358, KNTEN is deasserted, which causes the output of gates 218, 226Q, 224, and 222 to be deasserted. The toggling of SDB_DBL is discontinued at this stage, which causes BCLK_1X_2X to return to oscillating at the BCLK frequency.

During operation, the KNTEN signal is asserted when the DO_EMB signal is asserted, the LWR signal is asserted to indicated a write operation, and the MSBURST* signal is asserted. Once KNTEN is asserted, the output of gate 218 oscillates with the rising edge aligned with the falling edge of DBCLK. The OR gate 222 is driven by the AND gate 218 to oscillate. Additionally, the output of gate 224 also begins to oscillate during the KNTEN assertion period. The outputs of gate 224 and gate 218, which oscillate out of phase from each other during the KNTEN period, are provided to OR gate 222. The output of OR gate 222 is asserted during the entire period where one of the gates 218 or 224 oscillates. The output of OR gate 222 is latched on the rising edge of BCLK2X by the flip-flop 226. Because the output of the flip-flop 226 is ANDed with the delayed clock DBCLK, the speed-up signal is asserted only during the period where DBCLK is active.

The speed-up signal is presented to one input of the XOR gate 122 of FIG. 3. The other input of the XOR gate 122 is connected to the BCLK signal. Because the XOR gate output is asserted when the inputs are not equal, when SDB_DBL is not toggling, the variable clock signal BCLK_1X_2X tracks the BCLK signal. When SDB_DBL is toggling, the XOR gate 122 compares SDB_DBL to BCLK and asserts BCLK_1X_2X when the inputs are not equal. As can be seen, because the rising edge of BCLK2X is aligned with the rising edge of BCLK, the output of flip-flop 226, and subsequently the AND gate 228, transitions only at the beginning of a new BCLK cycle. Thus, the clock doubling effect of the clock multiplier of FIG. 3 is achieved in a smooth manner wherein the variable clock signal always maintain a 50% duty cycle even during the transition period from the original clock frequency to the multiplied clock frequency and back to the original clock frequency.

Figure 14:
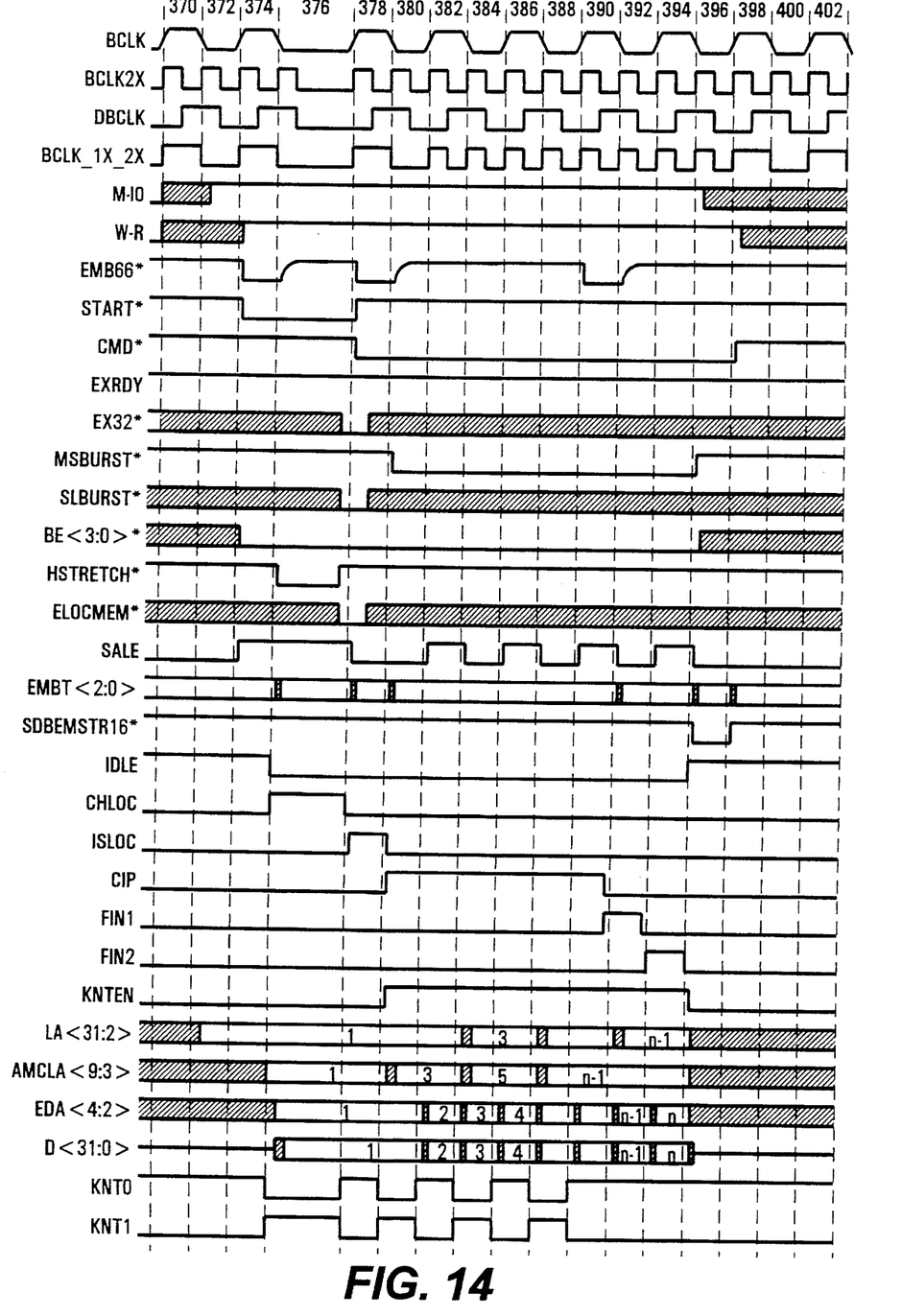
FIG. 14 is a timing diagram illustrating the timing relationships between bus control signals and the state machines of FIGS. 6 and 7 in the prediction of portions of the computer's address lines during a burst transfer cycle.

FIG. 14 is a composite timing diagram illustrating the relationship between various control signals, the outputs of the state machines of FIGS. 6 and 7, the variable clock frequency multiplication, and the address prediction during a burst transfer cycle. In period 370, the computer system is about to enter the burst mode. In period 372, the bus master 82 drives LA<31:2> and asserts M-IO to begin a new EISA cycle. In period 374, the bus master 82 asserts START*, W-R, BE* and EMB66* to request an EMB66 cycle. Up to period 374, the burst cycle tracker state machine is in the IDLE state and the count clock state machine is in state KNT0.

In period 376, HSTRETCH* is asserted to cause the system to wait for a DDF lookup cycle to be performed on the host bus 24. During this period, the cycle tracker state machine transitions to state CHLOC while the count clock state machine transitions to state KNT1, causing the counter 104 to load the starting address. At this point, AMCLA<9:3> is valid with the starting address of the EMB cycle. Near the end of this period, the lookup cycle is completed and HSTRETCH* is deasserted, allowing ELOCMEM* to be asserted.

In period 378, the EISA slave acknowledges its support of the EMB66 protocol by asserting EMB66*. Here, the cycle tracker state machine transitions to state ISLOC and the count clock state machine transitions back to state KNT0.

In period 380, the bus master 82 asserts MSBURST* in accordance with the EISA specification. Further, the cycle tracker state machine transitions to state CIP in this period, signalling that EMB66 burst transfer cycles are to be performed, while the count clock state machine transitions to state KNT1.

The burst transfer cycle is complicated by the requirement of certain interface devices, namely the memory controller AMC 30, that the addresses be provided ahead of the data sample point. Here, the address signals provided by LA<31:2> are late with respect to the needs of the memory controller AMC 30.

This problem is solved by the present invention through the use of the counter 104 to predict the system address by pre-incrementing address lines LA<9:3>. When the count clock state machine transitions to state KNT1 at the beginning of period 380, the counter 104 is also incremented and provides the predicted address AMCLA<9:3> one BCLK period ahead of the EISA bus' LA<9:3>.

In periods 382–388, the computer system performs the EMB66 burst transfer protocol. During these periods, the variable frequency multiplier smoothly multiplies the frequency of BCLK_1X_2X to achieve a frequency that is twice the frequency of BCLK. Further, the counter 104 is automatically incremented so that the predicted address AMCLA<9:3> appears one BCLK period ahead of the EISA bus' LA<9:3>. Additionally, in period 382 and in every other subsequent period, the outputs of EDA<4..2> are incremented so that the second 32-bit word can be properly routed through the SDB 44.

In period 390, EMB66* is asserted, indicating that the EMB66 cycle will be soon terminated. In period 392, the cycle tracker state machine transitions to state FIN1 while the count clock state machine transitions to state KNT0. Although the address line prediction for AMCLA<9:3> is henceforth suspended, bits EDA<4:2> continue to toggle to properly route the remaining data transfer.

In period 394, the cycle tracker state machine transitions to state FIN2. During this period, the last 32-bit word transfer is completed. In period 396, the cycle tracker state machine transitions to state IDLE. KNTEN and MSBURST* are also deasserted to indicate the end of the burst transfer cycle. In periods 396–402, the computer system resumes its regular EISA bus cycles.

The contiguous and ascending data transfer order of the EMB protocol is advantageously used according to the present invention to relax the tight timing constraints of the EMB extension by predicting and making available in advance certain information, namely the address signals, to the bus interface of the slave devices. As described above, as long as the computer is writing data to a slave device using the EMB66 mode, the counter output is incremented. The predicted address signals from the counter output are then presented in advance of the actual data transfer to other devices that interface with the EISA bus. Because the predicted address signals are provided well in advance relative to the address signals provided by the EISA bus in an EMB66 mode, the present invention relaxes the tighter timing margin imposed on the EMB-capable system so that the devices designed for the original EISA standard can still be used in designs that support the EMB extension. Further, the deterministic address sequencing of the EMB protocol enables the recipient of the EMB mode data transfer to predict the low-order address bits of the second 32-bit data pair.

Although the present invention uses a decoder in the form of state machines, it is known in the art to use other forms of decoder, including a decoder network synthesized from a number of logic devices such as AND-OR gates. Further, the implementation of the decoder is not limited to the PALs, but may include other programmable logic devices.

In addition, although the preferred embodiment uses a number of XOR gates as the frequency multipliers, it is known in the art to use a phase-locked-loop frequency multiplier to align the rising edges of the frequency multiplier to the rising edge of BCLK. Alternatively, it is known in the art to take the master clock frequency of the computer, which may be operated at a multiple of the BCLK frequency and divide the frequency down to twice the BCLK frequency using counters or flip-flops in such a way as to maintain the same rising edge relationship between the output of the variable frequency multiplier and BCLK. These circuits are equivalent to the circuit of the preferred embodiment.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A computer system having a burst transfer cycle for transferring data, comprising:

an expansion bus having a basic clock and control signals, said basic clock having a frequency and rising and falling edges, said control signals indicating the start and the end of the burst transfer cycle;

a fixed frequency multiplier coupled to said basic clock, said fixed frequency multiplier providing a clock having a frequency which is a multiple of the basic clock frequency, said fixed frequency multiplier clock having rising edges aligned with the rising and falling edges of said basic clock;

a decoder, said decoder coupled to said fixed frequency multiplier and to control signals of said expansion bus to detect the start and the end of the burst transfer cycle, said decoder providing a speed-up signal during the burst transfer cycle on the rising edges of said fixed frequency multiplier clock; and a variable frequency multiplier coupled to said basic clock and said speed-up signal, said variable frequency multiplier multiplying the frequency of said basic clock when said speed-up signal is provided and reproducing the frequency of the basic clock when said speed-up signal is deasserted, said variable frequency multiplier output having rising edges aligned with the rising and falling edges of said basic clock when multiplying the frequency and having rising edges aligned with the rising edges of said basic clock when reproducing the frequency.

2. The computer system of claim 1, wherein said fixed frequency multiplier includes a phase shifter coupled to said basic clock.

3. The computer system of claim 2, wherein said phase shifter shifts said basic clock by one quarter of the wavelength of said basic clock.

4. The computer system of claim 2, wherein said phase shifter is a delay line.

5. The computer system of claim 2, wherein said fixed frequency multiplier further includes an exclusive OR gate coupled to said phase shifter and said basic clock.

6. The computer system of claim 5, wherein said fixed frequency multiplier further includes a resistor coupled to the output of said exclusive OR gate.

7. The computer system of claim 1, wherein said variable frequency multiplier includes an exclusive OR gate coupled to said speed-up signal and said basic clock.

8. The computer system of claim 7, wherein said fixed frequency multiplier further includes a resistor coupled to the output of said exclusive OR gate.

9. The computer system of claim 1, wherein the frequency of said fixed frequency multiplier clock is twice the frequency said basic clock.

10. The computer system of claim 1, wherein the frequency of said variable frequency multiplier clock is twice the frequency said basic clock during the burst transfer cycle and the same as the frequency of said basic clock when not performing the burst transfer cycle.

11. The computer system of claim 1, wherein said burst transfer cycle communicates 32 bits of data per transfer.

12. The computer system of claim 1, wherein said expansion bus is an Extended Industry Standard Architecture bus.

13. The computer system of claim 1, further comprising a target device coupled to said expansion bus and to said decoder.

14. The computer system of claim 13, wherein said burst transfer cycle is performed after said target device and said decoder indicate a mutual support of said burst transfer cycle over an allocated sampling window by using control signals of said expansion bus.

* * * * *